United States Patent [19]

Lemelson

[11] 4,347,472
[45] Aug. 31, 1982

[54] APPARATUS AND METHOD FOR CHARGING A BATTERY IN A VEHICLE

[76] Inventor: Jerome H. Lemelson, 85 Rector St., Metuchen, N.J. 08840

[21] Appl. No.: 198,724

[22] Filed: Oct. 20, 1980

[51] Int. Cl.$^3$ ............................................... H02J 7/00
[52] U.S. Cl. ......................................... 320/2; 320/21; 320/28; 320/54
[58] Field of Search ........................................ 320/2–5, 320/22–24, 57, 59, 39, 40, 28, 54, 21

[56] References Cited

U.S. PATENT DOCUMENTS

| | | | |
|---|---|---|---|
| 2,273,038 | 9/1966 | Miller | 320/2 |
| 3,603,860 | 9/1971 | Johnson | 320/2 |
| 3,938,018 | 2/1976 | Dahl | 320/2 |
| 4,031,449 | 6/1977 | Trombly | 320/2 |
| 4,158,802 | 6/1979 | Rose | 320/2 |
| 4,234,839 | 11/1980 | King et al. | 320/2 X |

FOREIGN PATENT DOCUMENTS 2330255  1/1975  Fed. Rep. of Germany ........... 320/2

*Primary Examiner*—Robert J. Hickey

[57] ABSTRACT

A charging system is provided for a battery or batteries located within a motor vehicle. In one form, induction energy generating means is disposed within or adjacent to the floor of a garage or a driveway on which a motor vehicle may be parked and retained for a period of time. Induction energy receiving means located within the motor vehicle converts induction energy transmitted thereto from the induction energy generating means in the floor or driveway and generates electrical energy which is either directly applied to charge a battery of the motor vehicle or to a charging unit supported by the motor vehicle. Operation of the induction energy generating means may be effected by means of a manually operated switch supported adjacent the floor or driveway or by a device sensing the presence of the motor vehicle and/or a discharged battery located therein. In another form, when the battery and the motor vehicle is fully charged, a signal is generated by signal generating means sensing such charge and located within the motor vehicle which signal is transmitted by shortwave or as a sonic wave signal to a receiver which shuts off the induction energy generating means so as to conserve charging energy. In yet another form, charging current terminals located at the parking location and adapted to make contact with terminals of the motor vehicle when the vehicle is properly parked so as to provide charging electrical energy for the battery of the vehicle. Direct line communication, so established between the vehicle and a control means at the parking location, is employed to permit a sensor on the vehicle to signal such control means and terminate the application of charging current when the battery or batteries of the vehicle are fully charged.

3 Claims, 5 Drawing Figures

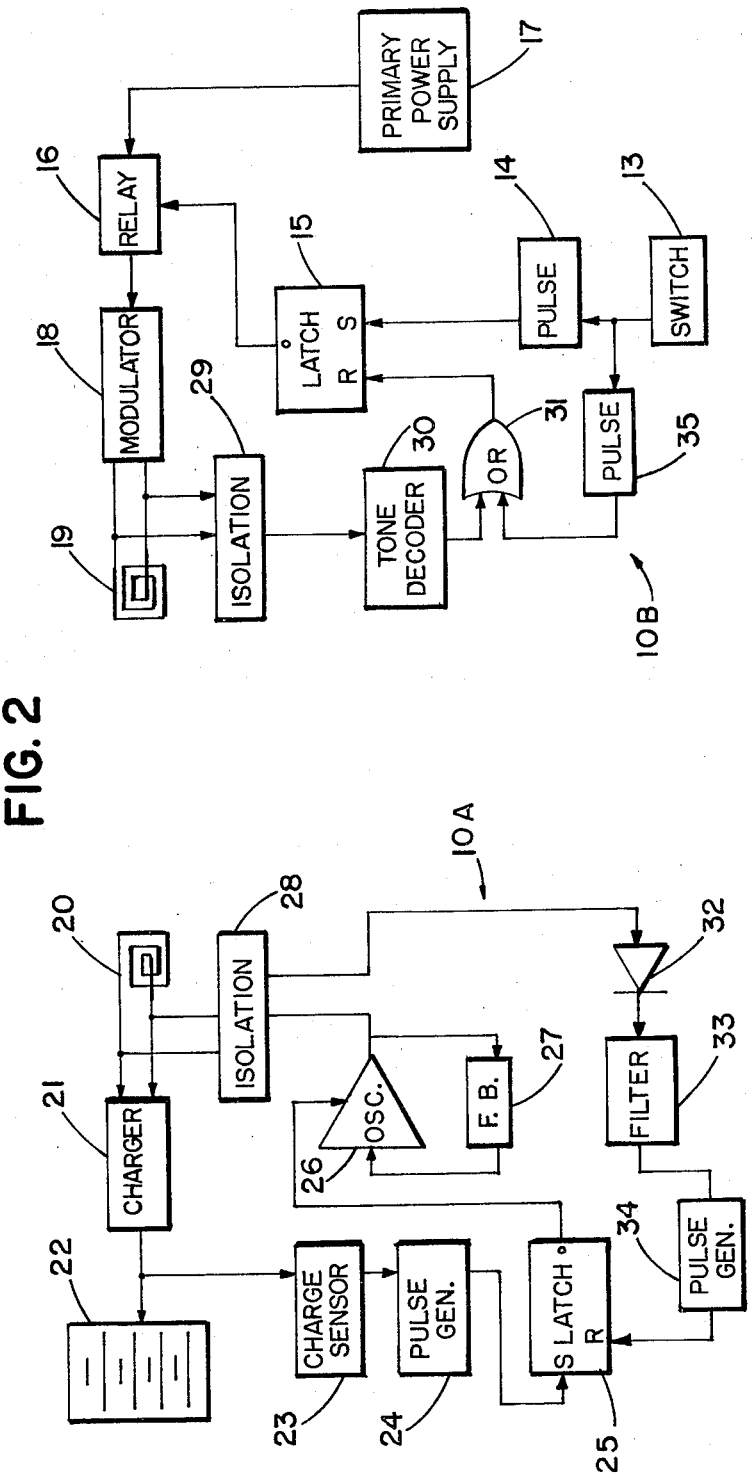
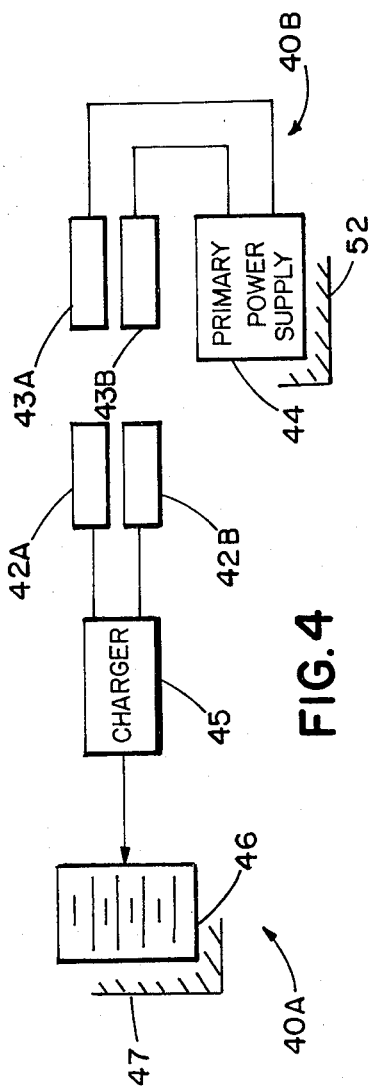
FIG. 2
FIG. 4

APPARATUS AND METHOD FOR CHARGING A BATTERY IN A VEHICLE

SUMMARY OF THE INVENTION

This invention relates to a system and method for automatically charging a battery or batteries located within a motor vehicle for powering such vehicle. In particular, the invention is directed to a system for charging a motor vehicle battery without the need for human action other than that required to park the motor vehicle at a specially constructed parking location such as one provided in a parking garage or other parking location having special charging equipment located thereat.

Electrically powered motor vehicles such as automobiles, small trucks, golf carts and other vehicles are becoming more popular and their use is increasing due to rapid rise in the cost of motor fuel made from petroleum experienced in recent years. Such vehicles at present are capable of travelling between forty and fifty miles at most per battery charge, quite often requiring that the batteries thereof be charged daily. The battery charging function has required that the operator of the vehicle park the vehicle in a garage and manually connect cable extending from a source of charging current to cable extending from the vehicle battery or battery charging circuit. The operation is tedious, subject to forgetting and may result in soiling of the hands and other inconvenience on the part of the user of the vehicle. Furthermore, if the operator forgets to uncouple the cable connection made for charging, damage to the cable may result from the sudden tensioning thereof and the connectors may become damaged or destroyed. The connector associated with the parking location may also be crushed by the wheel of the vehicle during parking or pulling out of the parking location if not properly disposed of by the operator.

Accordingly it is a primary object of this invention to provide a new and improved apparatus and method for charging the batteries of motor vehicles.

Another object is to provide a vehicle battery charging system which is automatic in operation and does not require human attendance or manual operation.

Another object is to provide a vehicle battery charging system in which cable connection to effect charging has been eliminated.

Another object is to provide an automatic motor vehicle battery charging system and method in which induction energy is provided or effecting the charging of a battery in a motor vehicle thus eliminating the need for using contacting members such as pluggable connectors.

Another object is to provide an automatic motor vehicle battery charging system which is normally off to conserve electrical energy and which operates automatically upon sensing the presence of a motor vehicle at a select location such as a parking location.

Another object is to provide an automatic motor vehicle battery charging system which automatically become deactivated to conserve electrical energy when a battery in a motor vehicle being charged becomes fully charged.

Another object is to provide a motor vehicle battery charging station which is specially constructed to preposition a motor vehicle thereat to permit the battery of the motor vehicle to be automatically charged by aligning charging means of the charging station with energy receiving means of the vehicle without the need for human attendance thereafter.

With the above and such other objects in view as may hereinafter more fully appear, the invention consists of the novel constructions, combinations and arrangements of parts as will be more fully described and illustrated in the accompanying drawings but it is to be understood that variations, changes and modifications may be resorted to which fall within the scope of the invention as claimed.

In the drawings:

FIG. 2 is a schematic diagram of the electronics employed to effect automatic vehicle battery charging in the parking arrangement shown in FIG. 1;

FIG. 4 is a schematic diagram of the charging system of the arrangement of FIG. 3.

Figure 1:
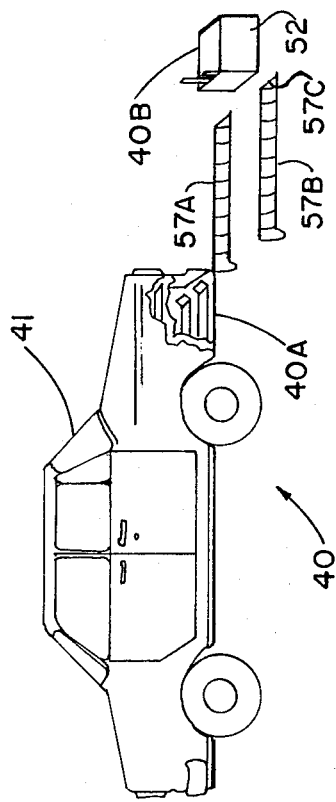
FIG. 1 is an isometric view of a motor vehicle, such as an automobile containing a receiver for charging radiation and a parking location specially designed to preposition the motor vehicle with respect to a charging energy generating and radiating unit.

While external power supplies and motor vehicle batteries are illustrated in the schematic diagrams of the drawings, power supply connections to all of the control and charging components have been omitted for the purpose of simplifying the drawings. Accordingly it should be understood with respect to all of the embodiments described and illustrated that power supplies having the correct polarities and magnitudes are provided, where not indicated in the drawings, so as to supply proper electrical energy for appropriately operating the various illustrated circuits as described in the following specification.

The instant invention employs a special charging unit for the battery or batteries of an electrically powered motor vehicle which charging unit is conveniently and properly supported at the front end of the motor vehicle in a preferred embodiment so as to permit it to receive charging energy when the vehicle is properly parked with respect to a source of such energy. Such location may be immediately behind the front end of the vehicle in a recepticle supported by the body or frame of the vehicle.

In FIG. 1 is shown a system 10 for charging a battery for a battery powered vehicle 11. Vehicle 11 supports within the body thereof a first electronic system 10A which communicates with a floor mounted electronic system 10B which is embedded within the pavement or floor of a garage or is located within or adjacent a wall thereof. Formed in the floor or pavement or provided as a separate device, are a pair of guides or channels 12A and 12B for the front tires of the motor vehicle which guides are operable, when the front left and right wheels of the motor vehicle are disposed therein, to predeterminately locate the vehicle on the pavement or within the garage with respect to a second electronic system denoted 10B. A limit switch 13 or detector is so located with respect to the guides 12A and 12B that it closes or detects a vehicle having its front wheels driven into and along the guides. The switch or detector 13 is employed to electrically activate a charging system under the control of subsystem 10B when the wheels engage a stop 12C at the end of channels or guides 12A and 12B.

In FIG. 2 is shown schematically further details of the electronic components of system 10. As vehicle 11 approaches and is aligned with subsystem 10B when the front wheels thereof are driven along the guides 12B and at least one wheel closes or is detected by switch 13, subsystem 10A of the vehicle becomes aligned with and activated by charging radiation generated by subsystem 10B. Activation of detector or limit switch 13 activates a pulse generator 14, which may comprise a one-shot multivibrator, which sets a latch 15 applying power from a power supply 17 such as alternating line current, to a relay 16. When relay 16 is energized, it transfers power from primary power supply 17 to a modulator 18 which applies such power directly to a primary coil 19 of a transformer or a converter which may first convert such power to a higher and more efficient frequency.

A coil 20, defining part of the vehicle mounted system 10A, intercepts the alternating magnetic field generated by primary coil 19 and applies the induced current generated to a charger circuit 21 which controls such current for application to a bank of vehicle mounted batteries or battery 22, thereby charging such battery when switch 13 is closed.

A charge sensor 23 constantly monitors the charge level of the battery 22 and, when such battery is not fully charged, activates a pulse generator 24, the output of which generator is applied to set a latch 25. When so set, latch 25 activates an oscillator 26 having an attendant feedback circuit 27. The output of oscillator 26 is applied to coil 20 through an isolation circuit 28 which protects the oscillator from voltage transients and high power feedthrough when power is transferred to the system 10A.

A tone signal generated by oscillator 26 is radiated by coil 20 and is picked up by coil 19 and converted to an electrical current which is conducted through an isolation circuit 29 which protects the circuit elements to which it is connected from overload by the commonly conducted high current signals which are transmitted to a tone decoder 30. The tone decoder 30 is set to detect the frequency signal output of oscillator 26. When such tone signal is detected, decoder 30 activates one input of an OR circuit 31 which, in turn, resets latch 15 thereby opening relay 16 and terminating the flow of current to the modulator 18 so as to conserve power when the vehicle batteries 22 are fully charged.

The termination of power generated in the oil 19, causes a lack of induced current to be generated in coil 20, which condition is sensed through an isolation means, detector 32 and filter 33 as a change in voltage at the output of the filter which activates a pulse generator 34 to generate an output which is applied to reset the latch 25, thereby turning off the oscillator 26 and conserving battery power.

Should vehicle 11 be moved from the charging location before charging is completed, limit switch or detector 13 opens or detects such condition, thereby activating a one-shot pulse generator 35, which responds to the leading edge of the wave form. The output of pulse generator 35 forms the other input to the OR gate 31 and, when said output is so activated, also resets latch 13 resulting in subsequent operation as described.

Figure 3:
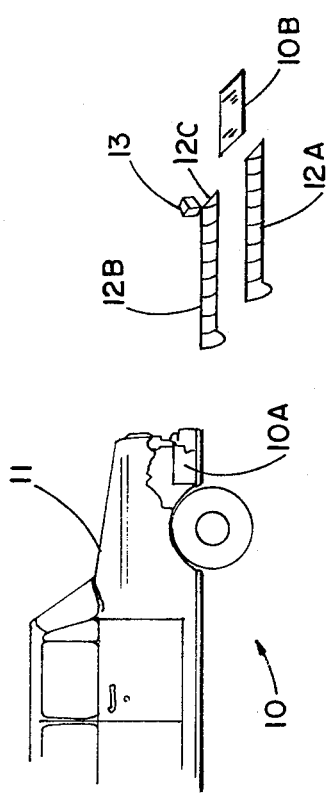
FIG. 3 is an isometric view of a motor vehicle and a parking location therefore whih effects charging of the battery of the motor vehicle by contact with contacts of the vehicle.

In another embodiment of the invention, illustrated in FIG. 3, primary power may be directly connected to charge the vehicle batteries. System 40 includes first electrical circuitry 40A supported within a housing 47 on a vehicle 41 and containing support electronics 40A'. A stationary floor mounted unit 40B and two tire guide wells 57A and 57B guide the tires or wheels of the vehicle and thereby insure proper alignment of the vehicle and its system 40A with floor mounted system 40B to properly allow the charging system 40 to operate when the tires touch end stops 47C.

In FIG. 4 is shown electronic components of system 40. When a vehicle 41, which contains a receiving and charging subsystem 40A, is driven into the charging parked position illustrated, a set of contacts 42A and 42B make respective electrical connection with contacts 43A and 43B which are provided within the housing 47. Such contact allows the flow of primary electrical energy from a primary source 44, such as line current provided in system 40B, to the charger circuit 45 of system 40A, which controls and converts such current for application to the battery bank 46 which may be used to derive and provide energy for propulsion power for the vehicle 41, thereby charging the battery bank 46. When a full charge on the battery 46 is reached, the charger 45 tapers the charging current to a trickle thereby effecting substantial energy conservation.

When the vehicle 41 is driven in reverse out of the channels or guides 57A and 57B for the front wheels thereof in a direction away from the front ends or stops 44C for the guides, sliding contact between the contacts 42A annd 42B of the vehicle subsystem 40A and the contacts 43A and 43B of the charging or parking location sybsystem 40B is disconnected and the flow of primary current ceases until the next connection is made between the vehicle contacts and the charging location.

Figure 5:
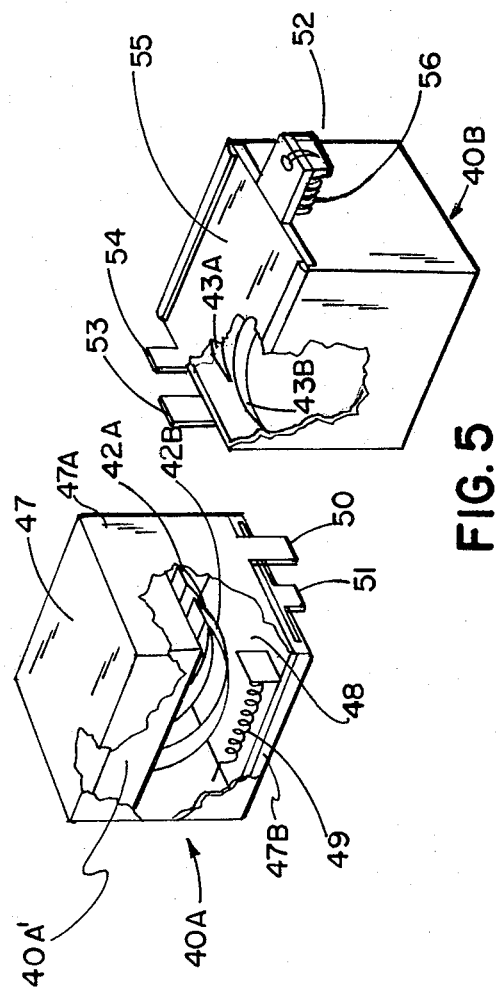
FIG. 5 is an isometric view of the parking location charging unit of FIG. 3 and the receiving charging unit mounted on the motor vehicle of FIG. 3.

In FIG. 5 is shown constructions of the vehicle mounted charging unit 40A and the parking or charging location unit 40B operable to provide protection of the contacts of each from contamination and atmospheric corrosion when not in use as described when the vehicle battery is being charged. Vehicle subsystem 40A is supported within a rigid box-shaped housing 47 which mounts the contact elements 42A and 42B therein which are preferably cantelevered high conductivity spring copper strips biased in a downward direction next to each other in close proximity to a sliding cover 48 disposed across an opening in the front end portion of the bottom wall 47B of housing 47. A tab 51 forms part of or is connected to the rearwardly sliding cover 48 which is adapted to become engaged by a tab 53 projecting upwardly from a rigid housing 52 which is supported on the floor or pavement between or at the end of the guides or channels 57A and 57B. The tab 53 is so located to force tab 51 completely opening the sliding cover 48 against a return spring 49 supported in housing 47 when the wheels of the vehicle come to rest against the stops 57C at the ends of the wheel guides 57A and 57B. Simultaneously as the bottom sliding cover 48 is moved to expose the opening in the bottom wall 47B of housing 47, a second tab 50 which is rigidly affixed to the front end wall 47A of housing 47 engages a tab 54 connected to and protruding upwardly from the sliding top wall 55 of fixed housing 52 for system 40B causing it to slide rearwardly against a spring 56 engaging the rear wall of housing 52 to expose the contacts 43A and 43B within the housing 52 so that they may make sliding contact with contacts 42A and 42B exposed through the opening in the bottom of housing 47.

Such contact is terminated when the vehicle is driven rearwardly from the stops 57C at the ends of channels 57A and 57B allowing the sliding covers 48 and 55 of the housings 47 and 52 to be returned to their closed positions by the springs 49 and 56. The closing action thus protects both sets of contacts from dirt and the environment when the charging unit is not in use and the vehicle is travelling. Closure of the cover 55 also prevents water from entering the housing 52 and reduces the possibility of shock or shorting. Covers 47B and 55 as well as their housings are preferably made of non-conducting materials such as plastic resins so as to prevent shorting of the contacts when the covers are closed which may bias thereagainst. The covers may also contain suitably placed abrasive strips located to wipe and clean their respective contacts as they open and close to clean same and maintain them in good conducting condition.

Suitable stops are provided for both covers 47B and 55 to prevent their removal from their respective housings. Housing 52 may also be spring mounted to yield in a direction parallel to the travel of the vehicle in guides 57A and 57B in the event that the vehicle is driven tightly against or beyond the end stops 57C and to return the housing to a predetermined location when the wheels of the motor vehicle come to rest at the operative location in the guides or channels as determined, for example, by low points or depressions therein which are so located as to dispose the contacts of the vehicle mounted input device and charging unit in operable position contacting the contacts of the charging location unit.

If the vehicle charging systems described are associated with a private garage or parking location which is not owned by the owner of the vehicle being charged and it is desired to bill or otherwise charge for each battery charged thereat, a suitable coin operated timing mechanism may be employed to enable or cause electrical energy to be generated and used as described in charging the batteries of an electrically operated motor vehicle parked at the charging location which energy may be terminated as described when charging is completed or may terminate when the timing mechanism runs out. Such timer may be manually adjusted by the purchaser's application of different amounts of money therein or by suitable manual adjustment means. If the cost of such electrical energy is to be charged to the user's account billing to the account may be effected by sensing with a sensor at the parking location an identifying means such as a coded electronic circuit provided on the vehicle by means as disclosed, for example, in my U.S. Pat. No. 4,189,712 and recording such code together with an indication of the electrical energy consumed in charging the batteries of the motor vehicle so identified.

An indication that the battery of the motor vehicle has been fully charged may be provided by instrumentation in the motor vehicle and/or by means of an indicating device at the parking location.

To protect the housing 52 from damage by the motor vehicle should the latter be driven beyond the end of the guides or channels 57A and 57B, it may be sunken in a cavity or hole in the ground or floor with only the tabs 53,54 and/or a portion of the housing protruding above ground level wherein the contacts 43A and 43B are driven by a mechanism connected to cover 55 or by a motor activated to project said contact upwardly against the contacts or terminals 42A and 42B of the motor vehicle when properly aligned therewith.

In the charging system illustrated in FIGS. 3-5, sensing means for detecting full charging of the vehicle batteries may be provided as described for opening a switch between the primary power supply 44 and the contacts 43A and 43B when full battery charging is sensed. Also, the rigid slidable doors of FIG. 5 may be replaced by flexible rubber covers which deform to permit mutual access to the contacts of each housing upon engagement of respective protrusions from each housing.

I claim:

1. A system for charging a battery in a motor vehicle comprising in combination:
   a motor vehicle containing a battery for operating said motor vehicle,
   a parking and charging location for said motor vehicle,
   first means at said parking location including means for generating an alternating magnetic field defining battery charging energy,
   second means at said parking location for sensing the presence of said motor vehicle at said parking location,
   third means controlled by said sensing means for activating said first means to cause the generation of charging energy when said sensing means senses the presence of said motor vehicle at said parking location,
   fourth means including induction means supported by said motor vehicle at a location thereon to generate charging electrical energy for said battery and means for inputting said charging electrical energy and applying same to charge the battery of said motor vehicle,
   fifth means for sensing the charge of said battery of said vehicle at said parking location,
   said fifth means including means for generating a short wave signal,
   sixth means at said parking location for receiving said short wave signal and converting same to an electrical control signal, and
   seventh means controlled by said control signal for deactivating said means controlled by said third means to substantially reduce the amount of said charging energy generated when said battery is substantially fully charged.

2. A system in accordance with claim 1 including means for prepositioning a motor vehicle at said parking and charging location to predeterminately align said first and fourth means to enable the charging of the battery of said motor vehicle with the energy generated by said first means.

3. A system in accordance with claim 1 wherein said fourth means is supported at the front end of said motor vehicle just above the ground and means for prepositioning said motor vehicle at said parking and charging location comprising respective right and left channel means for respectively guiding the right and left front wheels of a motor vehicle into alignment with said first means, and stop means for determining the longitudinal location of the vehicle wheels along said channel means.

* * * * *